(No Model.)

J. W. COLEMAN.
FOLDING BARROW TRUCK.

No. 329,623. Patented Nov. 3, 1885.

WITNESSES:
F. McArdle.
C. Sedgwick

INVENTOR:
J. W. Coleman
BY Munn & Co
ATTORNEYS.

UNITED STATES PATENT OFFICE.

JOSEPH WARREN COLEMAN, OF SCHOOLEY'S MOUNTAIN, NEW JERSEY.

FOLDING BARROW-TRUCK.

SPECIFICATION forming part of Letters Patent No. 329,623, dated November 3, 1885.

Application filed August 10, 1885. Serial No. 174,027. (No model.)

*To all whom it may concern:*

Be it known that I, JOSEPH WARREN COLEMAN, of Schooley's Mountain, in the county of Morris and State of New Jersey, have invented a new and Improved Folding Barrow-Truck, of which the following is a full, clear, and exact description.

My invention relates to the construction of that class of devices used more particularly to transport baggage short distances—as, for instance, from the office to the private rooms of a hotel; and the invention consists of a barrow-truck so constructed that the side bars may be folded together, and of certain other details of construction and combinations of parts, as will be hereinafter described, and specifically pointed out in the claims.

Reference is to be had to the accompanying drawings, forming part of this specification, in which similar letters of reference indicate corresponding parts in all the figures.

Figure 1:
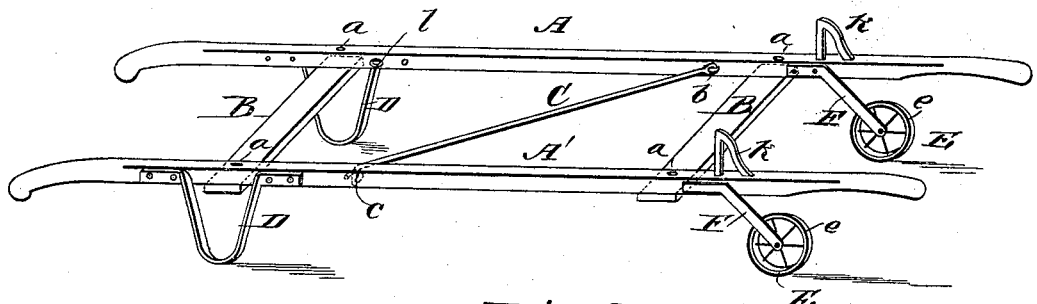
Figure 2:
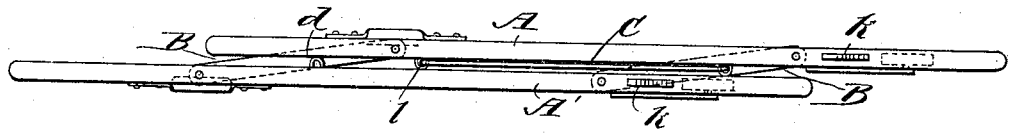
Figure 3:
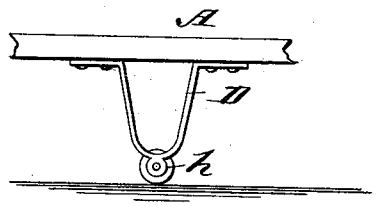

Figure 1 is a perspective view of my improved barrow-truck. Fig. 2 is a plan view of the same, representing the parts as folded together; and Fig. 3 is a detail view of a modified form of foot-rest.

The side bars, A A', which are preferably made of ash, but may be made of any other strong light wood, are formed with handles at each end and connected by cross-bars B B, which are secured to the bars A A' by pivot-bolts $a\ a$, so that they may be folded, as shown in Fig. 2, or spread open, as shown in Fig. 1, in which position they are held by the brace-rod C, connected by a staple, $b$, to the bar A, and formed with a hook, $c$, that engages with an eye, $d$, fixed in the bar A'. Small wheels E E are secured near one end of the bars A A' by means of brackets F F; and in order to prevent these wheels from injuring the floors or carpets over which the barrow may be wheeled, I greatly prefer to provide them with a rubber tire, $e$. Each of the bars A A' is provided with a foot-rest, D, and, if desired, these foot-rests may be formed so as to carry small wheels or rollers, as $h$.

In order to prevent the trunks or other articles that are being carried by my improved truck from sliding off, I secure stops $k\ k$ to the upper sides of the bars A A'.

When the truck is not in actual use, it may be folded up, as shown in Fig. 2, at which time the hook $c$ of the brace-rod C is held by the eye $l$, carried by the bar A.

Such a truck as I have described may be used to carry baggage from place to place within or out of the house, whether the same is to be moved upon the same floor or from story to story. Movable bottom and side pieces might be added, so that the truck would answer the purpose of an ordinary wheelbarrow.

Having thus described my invention, what I claim as new, and desire to secure by Letters Patent, is—

1. The combination, with the bars A A', carrying wheels E E, of the pivotally-connected bars B B and brace-rod C, substantially as described.

2. The combination, with the bars A A', carrying wheels E E and stops $k\ k$, of the bars B B, connected to said bars A A' by pivot-bolts $a\ a$, and the brace-rod C, secured to the bar A by a staple, $b$, and formed with a hook, $c$, arranged to engage with an eye, $d$, carried by the bar A', substantially as described.

3. The combination, with the bars A A', carrying wheels E E, having rubber tires $e$, of the cross-bars B B, pivotally connected to the bars A A', and the brace-rod C, substantially as described, and for the purpose specified.

JOSEPH WARREN COLEMAN.

Witnesses:
WM. H. VANSYCKLE, Jr.,
EDWIN C. ABBOT.